June 26, 1956
D. W. TAYLOR
CONVERGENCE CONTROL SYSTEM FOR COLOR
IMAGE REPRODUCING DEVICE
Filed Nov. 29, 1954
2,752,526
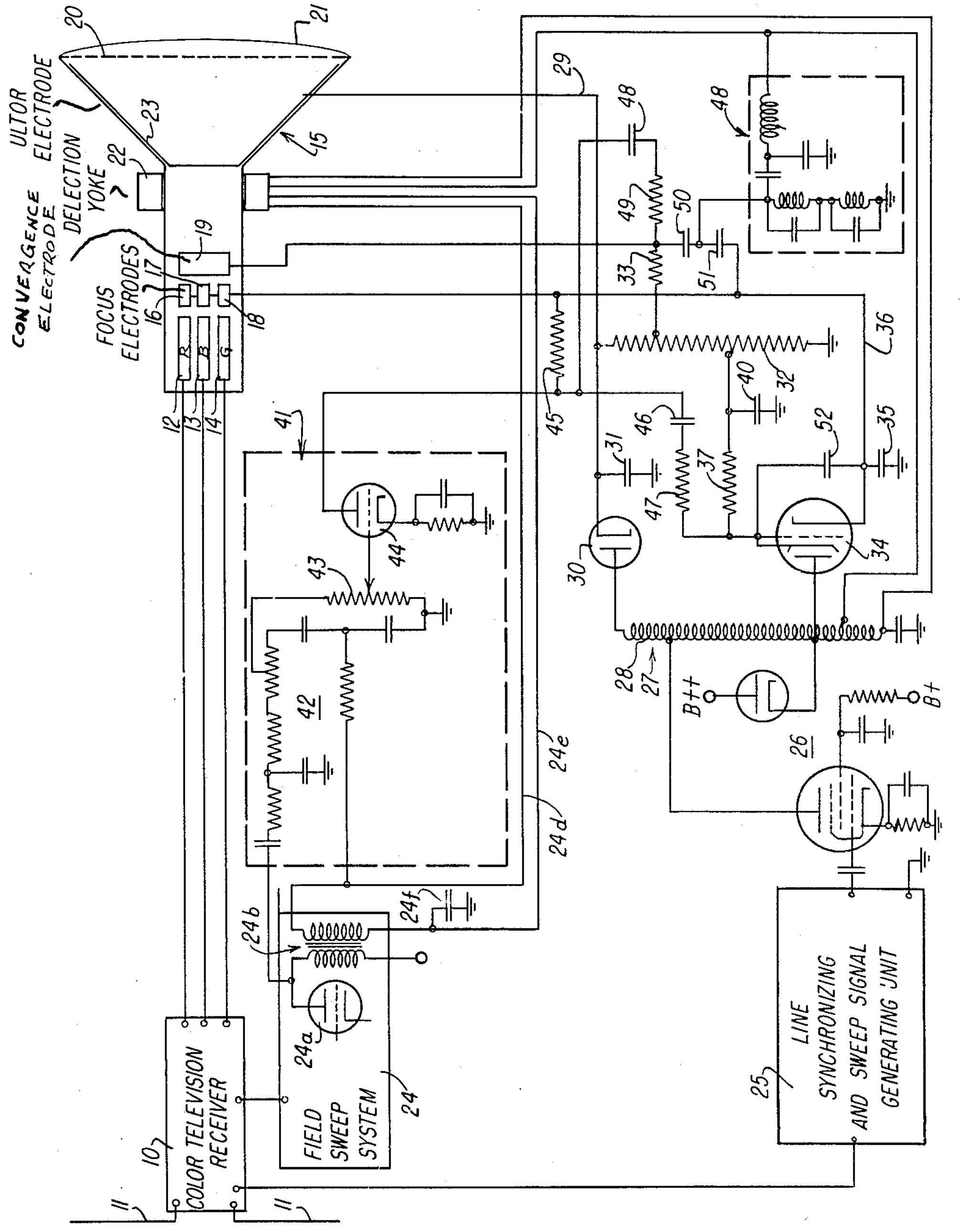
INVENTOR.
DOUGLAS W. TAYLOR
BY
Mueller & Aichele
Attorneys United States Patent Office 2,752,526

Patented June 26, 1956

2,752,526

CONVERGENCE CONTROL SYSTEM FOR COLOR IMAGE REPRODUCING DEVICE

Douglas W. Taylor, Chicago, Ill., assignor to Motorola, Inc., Chicago, Ill., a corporation of Illinois Application November 29, 1954, Serial No. 471,642

3 Claims. (Cl. 315—22)

The present invention relates to television receivers, and more particularly it relates to an improved circuit for supplying static and dynamic potentials to the electrodes of a color image reproducing or picture tube of the type having a plurality of cathode ray beams that are to be individually focused and collectively converged within the tube.

One generally known form of color television picture tube uses a plurality of cathode ray beams which are individually modulated with information of the respective primary colors used in the color system in which the tube is incorporated. The separate beams are passed through individual electrostatic focusing electrodes and then through a common electrostatic lens structure known as a convergence electrode, the latter electrode causing the beams to converge at a common point. This arrangement converges the beams, for example, in the plane of an apertured mask as the beams are scanned across the viewing screen of the reproducing tube. The apertured mask is spaced from the viewing screen and causes the beams to impinge with correct registry on respective fluorescent color dots arranged in symmetrical groups on the screen. The tube also includes an ultor electrode which serves to accelerate the beams and which usually is in the form of a metal membrane in contact with the internal surface of the viewing screen and sometimes connected to the metal cone of the tube.

It is evident that a proper relation must be maintained between the exciting potentials impressed on the focus, convergence and ultor electrodes, for if the ratio of these potentials changes, the beams are not maintained focused and converged in the plane of the apertured mask. This can produce loss of detail and color registry and general degradation of the reproduced image. These electrodes are energized by high static potentials, and it is usually necessary to impress additional dynamic potentials on the focus and convergence electrodes to maintain the focused and converged condition of the beams throughout each scanning cycle thereof.

The static potential impressed on the ultor electrode is usually derived from the line sweep system of the color television receiver, and this potential is subject to variations from time to time due to many causes such as load or source changes. Any variation in this potential, absent additional compensation, causes the beams to lose their focused and converged condition. For this reason, many complicated arrangements have been devised in the past to regulate the ultor potential and attempt to maintain it constant. However, for cathode ray tubes using electrostatic fields for focusing and convergence, it is a fundamental electronoptic law that the beam trajectories are not affected by variations of the ultor voltage as long as all intermediate electron voltages maintain a constant ratio with respect to the ultor voltage. The present invention is predicated upon this law, and in the system of the invention the potential applied to the ultor electrode is allowed to vary with no attempt being made to regulate this potential. Instead, the potentials applied to the focus and convergence electrodes are controlled so that they exhibit variations proportional to the variations in the ultor potential so as to maintain a constant ratio between these potentials and retain the focused and converged condition of the beams despite variations in the ultor potential. In such an arrangement, variations of the ultor static potential do not produce color contamination or de-focusing. It is true that such variation does produce changes in picture size and brightness, but as demonstrated for many years in monochrome television receivers, these changes are not troublesome and are hardly noticeable. In addition to the tracking of the static potentials, the present invention provides a control for the dynamic voltages applied to the focus electrodes, so that these voltages track the dynamic voltages applied to the convergence electrode to maintain a constant ratio therebetween in order that variations in these dynamic voltages have no effect on the focused and converged condition of the beams.

It is, accordingly, a general object of the present invention to provide an improved circuit for supplying static and dynamic potentials to the electrodes of a cathode ray image reproducing device which is constructed so that variation of these potentials does not adversely affect the operation of the reproducing device to any material or noticeable extent.

Another object of the invention is to provide an improved system for providing static potentials for the focus, convergence and ultor electrodes of a color image reproducing tube, and for producing dynamic potentials for the focus and convergence electrodes, which system is constructed so that color registration is maintained despite extraneous variations in any of these potentials.

A feature of the invention is the provision of an improved circuit for supplying a plurality of static and dynamic potentials to a cathode ray image reproducing tube, which potentials are so interrelated that variation in one of the potentials produces proportional variations in the others so as to maintain a constant ratio therebetween.

Another feature of the invention is the provision of an improved circuit for supplying static and dynamic potentials to the focus and convergence electrodes, and a static potential to the ultor electrode, of a color reproducing tube; in which the static potentials supplied to the focus and convergence electrodes are controlled to track the potential applied to the ultor electrode, and the dynamic potentials applied to the focus electrodes are controlled to track the dynamic potentials applied to the convergence electrode, so that variations in the static potentials applied to the ultor electrode produce proportional variations in the static potentials applied to the focus and convergence electrodes to maintain a desired constant ratio between these static potentials, and so that variations in the dynamic potentials applied to the convergence electrode produce proportional variations in the dynamic potential applied to the focus electrodes to maintain a desired constant ratio between the dynamic potentials.

Another feature of the invention is the provision of such an improved system in which the potentials supplied to the ultor and convergence electrodes of the color image reproducing device are derived from a first source and the potentials supplied to the focus electrodes are derived from a second source with the second source being controlled by the first source to maintain a desired constant ratio between these potentials despite extraneous variations therein.

The above and other features of the invention which are believed to be new are set forth with particularity in the appended claims. The invention itself, however, together with further objects and advantages thereof may best be understood by reference to the following description when taken in conjunction with the accompanying drawing in which the single figure is a schematic representation of a color television receiver in which the control system of the present invention is shown in detail.

Co-pending application Serial No. 436,012, filed June 11, 1954, in the name of Kurt Schlesinger and assigned to the present assignee, discloses and claims a power supply for a cathode-ray image reproducing tube which supplies static potentials to the various electrodes of these tubes. The power supply is constructed so that a constant ratio is maintained between these static potentials, despite variations in any one of them, so that the cathode-ray beams within the tube are maintained in a focused and converged condition. The present invention is concerned with a similar system, and in which provision is also made to maintain a constant ratio between various dynamic control potentials supplied to the electrodes of a cathode-ray image reproducing tube.

The invention is intended to be used in a color television receiver including a cathode-ray image reproducing tube having means for developing a plurality of cathode-ray beams therein, and which also includes means for converging the beams, means for focusing the beams and means for accelerating the beams; and which receiver also includes a line sweep system and a field sweep system. Specifically, the invention is directed to a power supply for the reproducing tube which comprises a source of a first unidirectional potential of a selected value but subject to vary therefrom, and means for impressing the first unidirectional potential on the accelerating means. First potential divider means is connected across the source for producing different potentials at different points thereon with each such potential being subject to vary with variations in the first uni-directional potential. Means is provided for connecting one of the points on the potential divider means to the converging means. The power supply includes a second source of a second uni-directional potential lower than the first potential, and means for impressing the second uni-directional potential on the focusing means of the reproducing tube. An electron discharge device is included in the second source and it includes a control electrode, the discharge device controlling the value of the second uni-directional potential in response to variations in a direct-current potential applied to its control electrode. A connection extends from a second of the points on the potential divider to the control electrode to cause the second uni-directional potential to follow variations in the first uni-directional potential so as to maintain a pre-determined relation therebetween. Second means is provided for deriving a field dynamic control potential from the field sweep system, with means for impressing the control potential on the converging means. Second potential divider means is connected across the circuit means, with means for coupling an intermediate point on the second potential divider means to the control electrode, so that the second uni-directional potential is controlled and its amplitude varied in accordance with the field dynamic control potential. Second circuit means is provided for deriving a line dynamic control potential from the line sweep system, with means for impressing the line dynamic control potential on the converging means. Third potential divider means is connected across the second circuit means, and means is provided for coupling an intermediate point on the third potential divider means to the control electrode so that the amplitude of the second uni-directional potential also varies in accordance with the line dynamic control potential.

The illustrated system includes a color television receiver 10 which is shown in block form and which may include any of the well-known components constituting present day color receivers. The input terminals of receiver 10 are connected to an appropriate antenna 11, and a first group of output terminals are respectively connected to the red, blue and green guns 12, 13 and 14 of a color cathode ray image reproducing tube 15. Device 15 may be of any known type, and it includes three individual, interconnected electrostatic focusing electrodes 16, 17 and 18 for individually focusing the cathode-ray beams respectively developed by the electron guns. The device also includes an electrostatic convergence electrode 19 which collectively converges the beams in the plane of an apertured mask 20 placed adjacent the viewing screen 21 of the tube. The tube also includes a usual deflection yoke 22 for scanning the beams in the line and field direction across screen 21, and it includes a conical shaped ultor electrode 23 for accelerating the beams to the viewing screen.

The system also has a field sweep system 24 which includes an output stage having an electron discharge device **24*a* and an output transformer 24*b*. The purpose of the output stage is to amplify the field deflection signal developed by the field sweep system, and the connections of this stage are extremely well-known, and it is believed unnecessary to show such connections in detail herein. The secondary winding of transformer 24*b* is coupled to the field deflection section of yoke 22 by leads 24*d*, 24*e*; lead 24*e* being bypassed to a point of reference potential or ground by capacitor 24*f***.

The system also includes a line synchronizing and sweep signal generating unit 25 which is coupled through an output stage 26 and a line output transformer 27 to the line deflection section of yoke 22. Output transformer 27 is of the auto-transformer type, and this transformer includes a high voltage winding 28. As is well-known, high voltage pulses are developed across transformer 27 during the line retrace intervals, and these pulses are used to supply the high voltage static potential to the ultor electrode of reproducing tube 15.

The present invention provides a first source for producing a first uni-directional potential which is impressed on the ultor electrode 23 by means of a lead 29. The first source includes a rectifying device 30 whose anode is connected to the extremity of the high voltage winding 28 of transformer 27, and whose cathode feeds into a grounded filter capacitor 31. In a typical color receiver this first source develops from 20 to 23 kilovolts.

A voltage divider means, comprising a potentiometer 32, is connected across the first source; and the voltage divider means produces selected potentials at selected points (*a*) and (*b*) thereon. It is evident that in the absence of load currents the latter potentials vary in proportion to variations of the ultor potential produced by the first source to maintain a constant ratio between the intermediate potentials at points (*a*) and (*b*) and the ultor potential. The convergence electrode 19 is connected to one of these potential points through an isolating resistor 33. Since the convergence electrode does not draw any appreciable current, the static potential through resistor 33 has a predetermined constant ratio with the static potential applied to the ultor electrode by lead 29, despite variations in the latter potential. Therefore, there is no need to attempt to regulate and maintain the ultor potential constant since, even though that potential varies, proportional variations of the convergence potential maintain the cathode ray beam converged in the plane of apertured mask 20.

The focus electrodes in a usual image reproducing device draw from 50 to 100 microamps, therefore, it is inappropriate to supply a static potential to these electrodes directly from the high impedance voltage divider 32. If such a connection were attempted, a fixed ratio between the focus potential and the convergence and ultor potentials could not be maintained due to the extraneous drop across the voltage divider means due to the varying current flow in the focus electrodes. Because of this current flow in the focus electrodes, a separate power supply is provided for producing a second uni-directional static potential for the focus electrodes. The second power supply includes a grid-controlled electron discharge device 34 having an anode connected to an intermediate point (*c*) on transformer 27 and having a cathode feeding into a grounded filter capacitor 35. The cathode is further connected to the focus electrodes through a lead 36. Discharge device 34 functions as a rectifier device (more specifically as a pulsed cathode follower) for the high voltage pulses appearing in transformer 27 and supplies a uni-directional potential to the focus electrodes that is lower than the ultor potential. In order that a constant ratio may be maintained between the ultor and focus potentials, the control electrode of device 34 is connected through a resistor 37 to intermediate point (*b*) on potential divider 32, the latter point being bypassed to ground through a capacitor 40.

In the illustrated circuit, the potential of the cathode of device 34 follows closely any changes in the potential on its control electrodes, and variations in its anode potential have no appreciable effect on the cathode (assuming that no grid current is drawn by the control electrode during the operation of the device). In this manner, variations in the potential in the last-mentioned point on the potential divider (which are proportional to variations in the ultor potential) produce proportional variations in the focus potential. Therefore, changes in the ultor potential produce linear tracking by the focus and convergence static potentials which is required to maintain the beams focused on the screen 21 and converged in the plane of mask 20.

Field sweep system 24 is coupled to a circuit 41 which uses the field deflection signal to produce a dynamic control voltage for the reproducing tube 15. The production of dynamic control voltages from the sweep systems of a television receiver are known, and circuit 41 may be of any desired type. In the illustrated embodiment, this circuit is connected in a manner similar to the dynamic control voltage circuits of copending application Serial No. 379,998 filed September 14, 1953, in the name of Kurt Schlesinger and Leroy W. Nero. The disclosed circuit includes a resistor-capacity network 42 connected to the primary and secondary windings of transformer 24*b*, and this network includes a potentiometer 43 connected to the control electrode of an amplifier electron discharge device 44. As fully described in the copending application, network 42 produces a dynamic control voltage of the field frequency and which contains both a linear and a parabolic component. The mixing ratio of these components is adjusted in network 42 so that the dynamic control voltage may have the proper waveform to maintain the beams focused and converged in device 15 throughout each field deflection cycle.

The anode of amplifier device 44 is connected through a load resistor 45 to the cathode of device 34 to obtain an anode potential for the device. The anode is further coupled to the control electrode of device 34 through a capacitor 46 and isolating resistor 47. In addition, the anode of device 44 is coupled to convergence electrode 19 through a coupling capacitor 49 and isolating resistor 49*a*.

Network 41, therefore, applies a field dynamic control voltage through device 44 to the convergence electrode 19. In addition, resistors 47, 37 function as a potential divider for the field dynamic control voltage, so that the voltage is impressed on the control electrode of the grid-controlled rectifier device 34 with a reduced amplitude. The reduced amplitude field dynamic control voltage causes the control electrode of device 34 to impress the reduced amplitude field dynamic control voltage on the focus electrodes 16—18, and this reduced amplitude voltage tracks the dynamic field control voltage impressed on convergence electrode 19 to maintain a constant ratio therebetween. Therefore, any extraneous variations in this dynamic control voltage does not affect the focused and converged condition of the beams in tube 15.

A line dynamic control voltage is derived from the line section of yoke 22 by a network 48. As in the case of the field dynamic control voltage, networks for producing line dynamic control voltages are well-known to the art, and circuit 48 is also similar to the circuit disclosed in the copending application referred to previously herein.

The line dynamic control voltage from network 48 is directly impressed on the convergence electrode 19 through a coupling capacitor 50. This dynamic control voltage is also impressed on the control electrode of device 34 through a capacitor 51 and a capacitor 52, the latter capacitor coupling the cathode of device 34 to the control electrode. Capacitors 51 and 35 form a capacitive potential divider for the line dynamic control voltage, so this voltage is impressed through capacitor 52 with reduced amplitude on the control electrode of device 34. Therefore, device 34 also impresses the line dynamic control voltage with reduced amplitude on the focus electrodes 16—18. Moreover, the reduced amplitude line convergence control voltage impressed on the focus electrodes is tracked with the line dynamic control voltage impressed on the convergence electrode 19, so that a constant ratio is maintained therebetween despite extraneous variation thereof.

The disclosed system provides, therefore, complete tracking between the static and the two sets of dynamic voltages supplied to the various electrodes of device 15, and by using various elements of the circuit for a dual purpose, the circuitry for accomplishing this is rendered relatively simple and economical to construct.

In a constructed embodiment of the invention the following constants were used for the various elements of the circuit and these are listed merely by way of example and are not intended to limit the invention in any way.

| | | |
|---|---|---|
| Potential divider 32 | megohms | 100 |
| Device 34 | | 1X6BQ6 |
| Device 44 | | 6SF5 |
| Reisistor 45 | megohms | 4.7 |
| Capacitor 48 | micromicrofarads | 1.200 |
| Resistor 49 | megohms | 1 |
| Resistor 33 | do | 15 |
| Capacitor 50 | micromicrofarads | 500 |
| Capacitor 51 | do | 100 |
| Capacitor 35 | do | 500 |
| Capacitor 52 | do | 100 |
| Resistor 37 | megohms | 3.9 |
| Capacitor 40 | microfarads | .002 |
| Resistor 47 | megohms | 1.5 |
| Capacitor 46 | micromicrofarads | 1200 |

The invention provides, therefore, a relatively simple and inexpensive arrangement for providing tracking between the static and dynamic potentials supplied to the ultor, convergence and focus electrodes of a color television reproducing tube, and provides a simple system for maintaining the cathode ray beams in the tube properly focused and converged despite variations in these potentials.

The invention obviates the need for a voltage regulator system for the ultor potential which, as previously noted, is relatively expensive and complicated, and which is incapable of providing absolute control of the ultor potential.

The present invention requires the addition of only one discharge device 34, and this device need not withstand excessive high voltages since the potential impressed thereon is usually of the order of 4,000 volts which is relatively low insofar as discharge devices are concerned. Furthermore, the full load of the power supply of the invention on the line sweep system is much less as compared with prior art regulated systems. For example, in a constructed embodiment of the invention, a load of 90 milliamps, was drawn from the line sweep system, as compared with about 190 milliamps, in prior regulated systems. Because of this, higher voltages for the ultor electrode can be obtained with a single rectifier. For example, voltages of the order of 20–23 kilovolts have been produced by a single rectifier 30, eliminating the need for complicated and expensive voltage doubler arrangements.

I claim:

1. In a color television receiver including a cathode-ray image reproducing tube having means for developing a plurality of cathode-ray beams therein; said tube also having means for converging the beams, means for focusing the beams and means for accelerating the beams, and said receiver further including a line sweep system and a field sweep system; a power supply for the reproducing tube including in combination, a source of a first uni-directional potential of a selected value but subject to vary therefrom, means for impressing the first uni-directional potential on said accelerating means, first potential divider means connected across said source for producing different potentials at various points thereon and each such potential being subject to vary with variations in said first uni-directional potential, means for connecting said converging means to one of said points on said potential divider means, a second source of a second uni-directional potential, means for impressing said second uni-directional potential on said focusing means, an electron discharge device included in said second source and including a control electrode, said discharge device controlling the value of said second uni-directional potential in response to variations in a direction current control potential applied to said control electrode, a connection extending from a second of said points on said potential divider means to said control electrode to cause said second uni-directional potential to follow variations in said first uni-directional potential so as to maintain a predetermined relation therebetween, circuit means for deriving a field dynamic control potential from the field sweep system, means for impressing said control potential on said converging means, second potential divider means connected across said circuit means, means for coupling an intermediate point on said second potential divider means to said control electrode, second circuit means for deriving a line dynamic control potential from the line sweep system, means for impressing said line dynamic control potential on said converging means, third potential divider means connected across said second circuit means, and means for coupling an intermediate point on said third potential divider means to said control electrode.

2. In a color television receiver including a cathode-ray image reproducing tube having means for developing a plurality of cathode-ray beams therein; said tube also having an electrode for converging the beams, electrode means for focusing the beams and an electrode for accelerating the beams, said receiver further including a line sweep system and a field sweep system; a power supply for the reproducing tube including in combination, a transformer winding across which an alternating-current potential appears, means including a first rectifier coupled across said winding to constitute a first source of a first uni-directional potential of a selected value but subject to vary therefrom, means for impressing the first uni-directional potential on said accelerating electrode, potential divider means connected across said first source for producing different potentials at various points thereon and each such potential being subject to vary with variations in said first uni-directional potential, a first connection including a first resistance means extending from one of said points on said potential divider means to said converging electrode, circuit means coupled across a portion of said transformer winding for producing a second uni-directional potential and including a discharge device having a control electrode and a cathode, a second connection extending from said cathode to said focusing electrode means, a third connection including a second resistance means extending from a second of said points on said potential divider to said control electrode to cause said second uni-directional potential to follow variations in said first uni-directional potential so as to maintain a predetermined relation therebetween, circuit means for deriving a field dynamic control potential from said field sweep system, means for impressing said field dynamic control potential on said converging electrode, a coupling circuit including a third resistance means extending from said circuit means to said control electrode, capacitor means by-passing said second point on said potential divider means to a point of reference potential, second circuit means for deriving a line dynamic control potential from the line sweep system, a second coupling circuit for impressing said last named control potential on said converging means, a third coupling circuit including series capacitor means between said second circuit means and said control electrode, and capacitor means connected to said point of reference potential and forming a potential divider for said last named control potential with said series capacitor means in said third coupling circuit and in respect to said control electrode.

3. In a color television receiver including a cathode-ray image reproducing tube having means for developing a plurality of cathode-ray beams therein; said tube also having an electrode for converging the beams, electrode means for focusing the beams and an electrode for accelerating the beams; said receiver further including a line sweep system and a field sweep system; a power supply for the reproducing tube including in combination, a transformer winding across which an alternating-current potential appears, means including a first rectifier effectively coupled across said winding to constitute a first source of a first uni-directional potential of a selected value but subject to vary therefrom, means for impressing the first uni-directional potential on said accelerating electrode, potential divider means connected across said first source for producing different potentials at various points thereon and each such potential being subject to vary with variations in said first uni-directional potential, a first connection including a first resistance means extending from one of said points on said potential divider to said converging electrode, a grid controlled rectifier device having an anode connected to an intermediate point on said transformer winding, and having a control electrode and a cathode, a second connection extending from said cathode to said focusing electrode means to supply a second unidirectional potential thereto, capacitor means by-passing said cathode to a point of reference potential, a third connection including a second resistance means extending from a second of said points on said potential divider to said control electrodes to cause said second uni-directional potential to follow variations in said first uni-directional potential so as to maintain a predetermined relation therebetween, capacitor means by-passing said second point on said potential divider to said point of reference potential, circuit means for deriving a field dynamic control potential from said field sweep system, means for impressing said field dynamic control potential on said converging electrodes, a coupling circuit including a third resistance means extending from said circuit means to said control electrode, second circuit means for deriving a line dynamic control potential from the line sweep system, a second coupling circuit for impressing said line dynamic control potential on said converging means, a third coupling circuit including series capacitor means extending between said second circuit means and said cathode, and capacitor means connected between said control electrode and said cathode.

No references cited.